US011263212B1

(12) United States Patent
Antova et al.

(10) Patent No.: US 11,263,212 B1
(45) Date of Patent: Mar. 1, 2022

(54) DYNAMIC PARTITION SELECTION

(71) Applicant: Pivotal Software, Inc., San Francisco, CA (US)

(72) Inventors: Lyublena Rosenova Antova, Sunnyvale, CA (US); Amr El-Helw, San Mateo, CA (US); Mohamed F. Soliman, San Mateo, CA (US); Zhongxian Gu, Davis, CA (US); Michail Petropoulos, San Francisco, CA (US); Florian Michael Waas, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 16/712,592

(22) Filed: Dec. 12, 2019

Related U.S. Application Data

(63) Continuation of application No. 15/488,879, filed on Apr. 17, 2017, now Pat. No. 10,509,783, which is a
(Continued)

(51) Int. Cl.
*G06F 16/2453* (2019.01)
*G06F 16/28* (2019.01)
(Continued)

(52) U.S. Cl.
CPC .... *G06F 16/24544* (2019.01); *G06F 16/2456* (2019.01); *G06F 16/24537* (2019.01);
(Continued)

(58) Field of Classification Search
CPC ............... G06F 16/24544; G06F 16/27; G06F 16/24537; G06F 16/284; G06F 16/24542;
(Continued)

(56) References Cited

U.S. PATENT DOCUMENTS

| 5,857,180 A | 1/1999 | Hallmark et al. |
| 7,984,043 B1 | 7/2011 | Waas |

(Continued)

OTHER PUBLICATIONS

"IBM DB2 Administration Guide," IBM Knowledge Center, 2007. retrieved on Sep. 24, 2014, http://www-01.iBM.com/support/knowledgecenter/#!/SSEPEK_10.0.0/com.ibm.db2z10.doc.admin/src/admin/db2z_admin.dita, 1 page.
(Continued)

*Primary Examiner* — Pierre M Vital
*Assistant Examiner* — Alicia M Antoine
(74) *Attorney, Agent, or Firm* — Fish & Richardson P.C.

(57) ABSTRACT

Methods, systems, and apparatus, including computer programs encoded on computer storage media, for dynamic partition selection. One of the methods includes receiving a representation of a query plan generated for a query, wherein the query plan includes a dynamic scan operator that represents a first computing node obtaining tuples of one or more partitions of a table from storage and transferring the tuples to a second computing node that executes a parent operator of the dynamic scan operator. A partition selector operator is generated corresponding to the dynamic scan operator. A location in the query plan is determined for the partition selector operator. A modified query plan is generated having the partition selector operator at the determined location.

17 Claims, 13 Drawing Sheets

Related U.S. Application Data continuation of application No. 14/314,863, filed on Jun. 25, 2014, now Pat. No. 9,652,496.

(51) Int. Cl.
| | |
|---|---|
| *G06F 16/2455* | (2019.01) |
| *G06F 16/27* | (2019.01) |
| *G06F 16/901* | (2019.01) |

(52) U.S. Cl.
CPC .. *G06F 16/24542* (2019.01); *G06F 16/24554* (2019.01); *G06F 16/27* (2019.01); *G06F 16/284* (2019.01); *G06F 16/9024* (2019.01); *G06F 16/9027* (2019.01)

(58) Field of Classification Search
CPC ........... G06F 16/24554; G06F 16/2456; G06F 16/9027; G06F 16/9024
USPC ....................................................... 707/718
See application file for complete search history.

(56) References Cited

U.S. PATENT DOCUMENTS

| | | | | |
|---|---|---|---|---|
| 2002/0198872 | A1* | 12/2002 | MacNicol | G06F 16/24556 |
| 2003/0172059 | A1* | 9/2003 | Andrei | G06F 16/24554 |
| 2004/0006561 | A1* | 1/2004 | Nica | G06F 16/24544 |
| 2006/0218123 | A1* | 9/2006 | Chowdhuri | G06F 16/24532 |
| 2009/0037365 | A1 | 2/2009 | Sinclair et al. | |
| 2010/0030741 | A1 | 2/2010 | Johnson et al. | |
| 2011/0131199 | A1 | 6/2011 | Simon et al. | |
| 2013/0054567 | A1* | 2/2013 | Graefe | G06F 16/24542 707/714 |
| 2014/0164353 | A1 | 6/2014 | Shankar et al. | |
| 2014/0310259 | A1 | 10/2014 | Tian et al. | |
| 2015/0286681 | A1* | 10/2015 | Baer | G06F 16/24554 707/754 |

OTHER PUBLICATIONS

"Pivotal HD: HAWQ," Pivotal Software, 2013, http://www.pivotal.io/sites/default/files/Hawq_WP_042313_FINAL.pdf, 4 pages.

"TPC BenchmarkTMDS (TPC-DS): The New Decision Support Benchmark Standard," TPC-Transaction Processing Performance Council, 2005, retrieved on Sep. 24, 2014, http://www.tpc.org/tpcds, 1 page.

"TPC-H is an ad-hoc. decision support benchmark," TPC-Transaction Processing Performance Council, 1993, retrieved on Sep. 24, 2014, http://www.tpc.org/tpch, 2 pages.

Graefe, "The Cascades Framework for Query Optimization," IEEE Data Eng. Bul., 1995, 18(3), 10 pages.

Herodotou et al., "Query Optimization Techniques for Partitioned Tables." SIGMOD, 2011, 12 pages.

Kling et al., "Generating Efficient Execution Plans for Vertically Partitioned XML Databases," 2010, Proceedings of the VLDB Endowment, vol. 4. No. 1, pp. 1-11.

Morales, "Oracle Database VLDB and Partitioning Guide 11g Release 1 (11.1)," Oracle, Jul. 2007, 216 pages.

Sarwat et al., "Horton+: A Distributed System for Processing Declarative Reachability Queries over Partitioned Graphs," 2013, Proceedings of the VLDB Endowment, vol. 6, No. 14, 12 pages.

Sybase, Inc., Performance and Tuning: Optimizer and Abstract Plans, 2003, retrieved on Sep. 30, 2014, http://infocenter.sybase.com/help/topic/com.sybase.dc20023_1251/pdf/optimizer.pdf, 444 pages.

Talmage, "Partitioned Table and Index Strategies Using SQL Server 2008," Microsoft, 2009, retrieved Sep. 30, 2014, http://msdn.microsoft.com/en-US/library/dd578580.aspx, 65 pages.

Wu et al., "Partitioning Technique for Fine-grained Indexing," 2011, IEEE, ICDE Conference 2011, pp. 1127-1138.

Zhou et al., "Advanced Partitioning Techniques for Massively Distributed Computation," SIGMOD, 2012, 12 pages.

\* cited by examiner

Date Dimension (110)

| Date_id | Year | Month | Day | Day of Week |
|---|---|---|---|---|
| 6549 | 2012 | 7 | 25 | Thursday |
| 6550 | 2012 | 7 | 26 | Friday |
| 6551 | 2012 | 7 | 27 | Saturday |
| ... | | | | |
| 8952 | 2013 | 11 | 4 | Sunday |
| 8953 | 2013 | 11 | 5 | Monday |
| 8954 | 2013 | 11 | 6 | Tuesday |
| ... | | | | |

112 brackets rows 6549–6551; 114 brackets rows 8952–8954.

Orders (120)

| Order_id | Date_id | Status | Amount | Customer |
|---|---|---|---|---|
| 8463 | 6551 | canceled | $5.99 | John Smith |
| 2516 | 6551 | complete | $37.99 | Bob Brown |
| ... | | | | |
| 9541 | 8953 | pending | $12.99 | Gail Garner |
| 9652 | 8954 | complete | $3.49 | Susan Lee |
| ... | | | | |

122 brackets rows 8463–2516; 124 brackets rows 9541–9652.

FIG. 1A

Orders (140)

| Year | Region | Status | Amount | Customer |
|---|---|---|---|---|
| 2012 | 1 | canceled | $5.99 | John Smith |
| 2012 | 1 | complete | $37.99 | Bob Brown |
| ... | | | | |
| 2012 | 2 | pending | $12.99 | Gail Garner |
| 2012 | 2 | complete | $3.49 | Susan Lee |
| ... | | | | |
| 2013 | 1 | pending | $8.49 | Mary Green |
| 2013 | 1 | pending | $21.99 | Jim Carter |
| ... | | | | |
| 2013 | 2 | pending | $5.49 | Bob Johnson |
| 2013 | 2 | canceled | $13.30 | Abby Anderson |
| ... | | | | |

FIG. 1B

DYNAMIC PARTITION SELECTION

CROSS-REFERENCE TO RELATED APPLICATIONS

This application is a continuation of, and claims priority to, pending U.S. application Ser. No. 15/488,879, filed Apr. 17, 2017, which is a continuation of U.S. application Ser. No. 14/314,863, filed Jun. 25, 2014 (now U.S. Pat. No. 9,652,496). The disclosures of the prior applications are herein incorporated by reference in its entirety.

BACKGROUND

This specification relates to query planning for distributed databases.

Massive distributed databases include tables that are partitioned across multiple storage devices, in which each partition stores a subset of rows or columns of a particular table.

When a distributed database system receives a query, the system can compute a result for the query by scanning one or more partitions of a particular table. Some systems support static partition elimination, in which some partitions can be eliminated from consideration according to a value specified in the query itself.

SUMMARY

This specification describes how a system can implement dynamic partition selection to compute a result for a query. A system can generate query plans that use partition selector operators that compute, dynamically and at query runtime, which partitions to scan and which partitions can be eliminated from consideration. A dynamic scanner operator receives identifiers of partitions to scan and scans only those partitions.

In general, one innovative aspect of the subject matter described in this specification can be embodied in methods that include the actions of receiving a representation of a query plan generated for a query, the query plan comprising a plurality of operators that, when executed by one or more computing nodes, cause the computing nodes to compute a result for the query, wherein the query plan includes a dynamic scan operator that represents a first computing node obtaining tuples of one or more partitions of a table from storage and transferring the tuples to a second computing node that executes a parent operator of the dynamic scan operator; generating a partition selector operator corresponding to the dynamic scan operator, wherein the partition selector operator represents a third computing node that executes the partition selector operator including determining one or more partition identifiers of partitions of the table and transferring the one or more partition identifiers to the dynamic scan operator of the second computing node; determining a location in the query plan for the partition selector operator, including determining a first operator in the query plan that is a parent operator or a child operator of the partition selector operator; and generating a modified query plan having the partition selector operator at the determined location. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The query plan is represented as a graph, wherein each operator in the query plan is a node in the graph, and wherein each edge between a first graph node and a second graph node in the graph represents a first computing node, that executes a first operator represented by the first graph node, transferring output of the first operator to a second computing node that executes a second operator represented by the second graph node. Determining a location in the query plan for the partition selector operator comprises determining, for each operator in the query plan, whether the dynamic scan operator occurs in a subtree rooted at the operator. The actions include determining that the dynamic scan operator does not occur in a subtree rooted at a particular operator; and in response to determining that the dynamic scan operator does not occur in a subtree rooted at the particular operator, adding the partition selector as a parent operator of the particular operator in the query plan. The actions include determining that the dynamic scan operator occurs in a subtree rooted at a particular operator; and in response to determining that the dynamic scan operator occurs in a subtree rooted at the particular operator, pushing the partition selector to a child operator of the particular operator. Pushing the partition selector to a child operator of the particular operator comprises recursively calling a partition location function for the child operator. The particular operator is a join operator that computes pairs of first tuples of a first table and second tuples of the table that have matching values. The actions include determining that the dynamic scan operator is defined in an outer subtree of the join operator; and in response to determining that the dynamic scan operator is defined in an outer subtree of the join operator, pushing the partition selector to an outer child operator of the join operator. The actions include determining that the partition selector includes a predicate expression on a partitioning key; and in response to determining that the partition selector includes a predicate expression on a partitioning key, pushing the partition selector to an outer child operator of the join operator. The actions include determining that the partition selector does not include a predicate expression on a partitioning key; and in response determining that the partition selector does not include a predicate expression on a partitioning key, pushing the partition selector to an inner child operator of the join operator. The particular operator is a select operator that requests, from the table, one or more tuples having respective values according to a first predicate expression in a query, and wherein pushing the partition selector to a child operator of the particular operator comprises appending the first predicate expression to the partition selector, wherein appending the first predicate expression to the partition selector operator causes a particular computing node to determine, from the first predicate expression and a partition selection function, one or more partitions of the table that may include tuples having respective values that satisfy the predicate expression. The table is a multilevel partitioned table, wherein the first predicate expression references a first partitioning key of the table, wherein the query includes a second predicate expression on a second partitioning key of the table, and wherein the particular computing node determines, by providing the first predicate expression and the second predicate expression as input to the partition selection function, one or more partitions of the table that may include tuples having respective values that satisfy the first predicate expression and the second predicate expression. Appending the first predicate expression to the partition selector comprises receiving a second predicate expression of the partition selector; computing a combined predicate expression, the combined predicate expression comprising a conjunction of the first predicate expression with the second predicate expression, wherein the particular computing node determines, from the combined predicate expression and the partition selection function, one or more partitions of the table that may include tuples having respective values that satisfy the combined predicate expression.

In general, another innovative aspect of the subject matter described in this specification can be embodied in a system that includes one or more computers and one or more storage devices storing instructions that are operable, when executed by the one or more computers, to implement components comprising a select operator that requests, from a first table, one or more tuples having respective values according to a predicate expression in a query, wherein the first table is partitioned by the first attribute; a partition selector that determines, from the predicate expression in the query according to a partition selection function, one or more partitions of a table that may include tuples having respective values that satisfy the predicate expression and provides respective identifiers for the one or more partitions to a dynamic scanner; and a dynamic scanner that receives, from the partition selector, respective identifiers of the one or more partitions, obtains tuples of the one or more partitions from storage, and provides the one or more obtained tuples to the select operator.

The foregoing and other embodiments can each optionally include one or more of the following features, alone or in combination. The system includes a sequence operator that causes the dynamic scanner to begin obtaining tuples from the one or more partitions after the partition selector has provided all the respective identifiers to the dynamic scanner. The one or more partitions include less than all of the partitions of the table. The table is a multilevel partitioned table, and the predicate expression references a first partitioning key of the table, wherein the query includes a second predicate expression on a second partitioning key of the table, and wherein the partition selector determines, by providing the first predicate expression and the second predicate expression as input to the partition selection function, one or more partitions of the table that may include tuples having respective values that satisfy the first predicate expression and the second predicate expression.

In general, another innovative aspect of the subject matter described in this specification can be embodied in a system that includes one or more computers and one or more storage devices storing instructions that are operable, when executed by the one or more computers, to implement components comprising a join operator that computes pairs of first tuples of a first table and second tuples of a second table that have matching values, including matching first values of a first attribute of the first table, and matching second values of a second attribute of the second table, wherein the second table is partitioned by the second attribute of the second table; a table scanner that obtains first tuples of the first table from storage and provides the obtained first tuples to a partition selector; a partition selector that determines, according to a partition selection function for the second table, one or more partitions of the second table that may include second tuples having respective second values that match first values of the first tuples for the first attribute, and provides respective identifiers for the one or more partitions of the second table to a dynamic scanner; and a dynamic scanner that receives, from the partition selector, respective identifiers of the one or more partitions of the second table, obtains second tuples of the one or more partitions from storage, and provides the obtained second tuples to the join operator.

The foregoing and other embodiments can each optionally include one or more of the following features, alone or in combination. The partition selector provides the first tuples to the join operator. The one or more partitions of the second table include less than all of the partitions of the second table. The partition selector provides the first values of the first tuples to the partition selection function, and wherein the partition selection function returns one or more partitions.

Particular embodiments of the subject matter described in this specification can be implemented so as to realize one or more of the following advantages. The performance of computing a result for a query can be dramatically improved by using dynamic partition selection. A system can dynamically select partitions using a variety of partition selection predicate expressions, including query runtime comparison of table attribute values to constants and other query parameters. The class of supported predicate expressions can be extended without altering the mechanism for selecting and scanning partitions. The query plans that are generated using dynamic partition selection have a constant size. In other words, the system need not enumerate all the partitions of a system within the query plan itself.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A illustrates an example partitioning of two tables.
FIG. 1B illustrates multilevel table partitioning.

Like reference numbers and designations in the various drawings indicate like elements.

DETAILED DESCRIPTION

Figure 2:
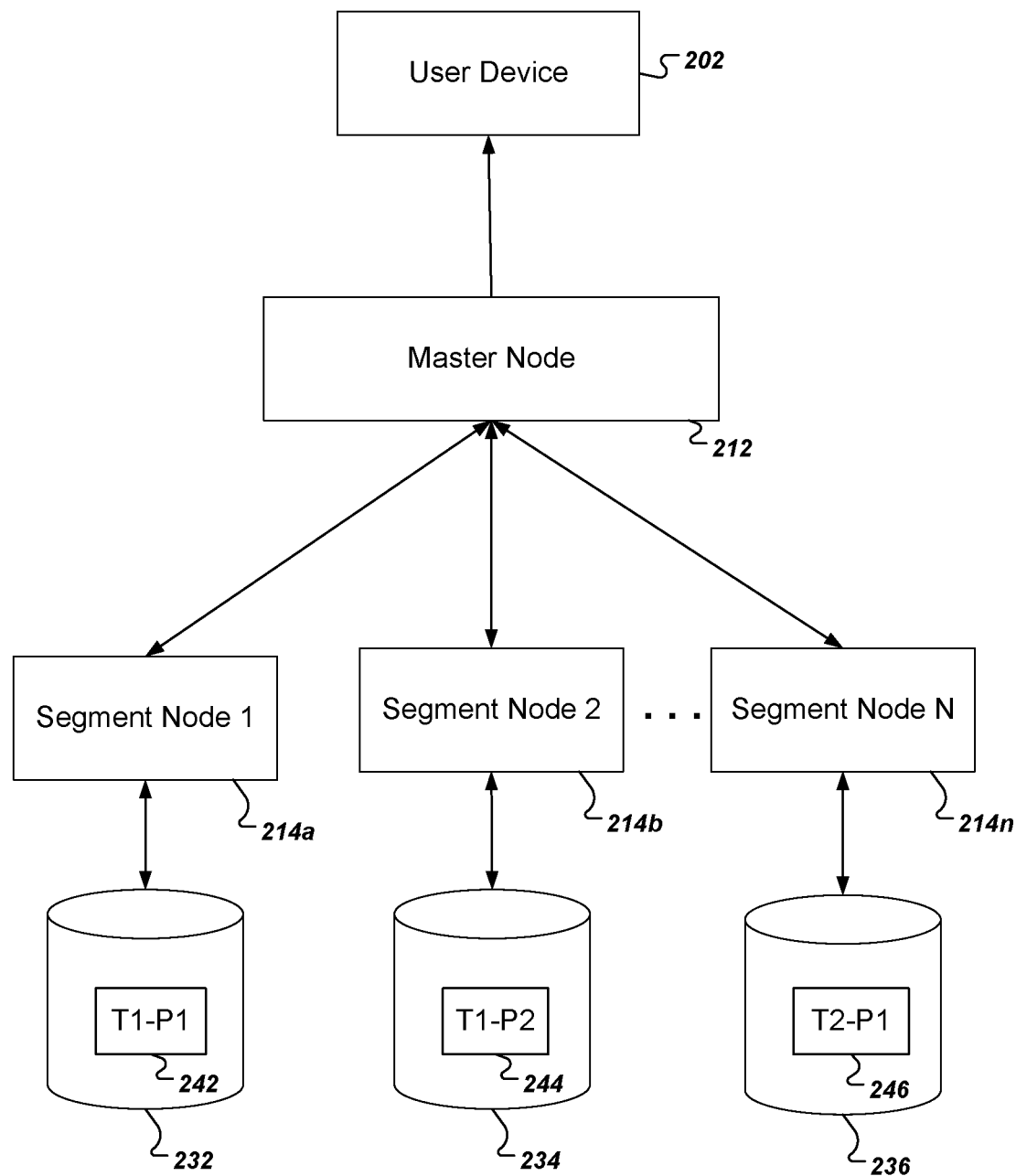
FIG. 2 is a diagram of an example system.

This specification describes how a system can implement dynamic partition selection in order to eliminate scanning of partitions that do not include tuples needed to satisfy a query.

FIG. 1A illustrates an example partitioning of two tables. The Date Dimension table 110 includes rows that correspond to unique calendar days. The Date Dimension table 110 has columns including a unique primary key date_id for each row. Each row also includes a corresponding year, month, day, and day of the week for the corresponding calendar day.

The Date Dimension table 110 is partitioned by the year attribute. Thus, the partition 112 might include date_ids for dates that occur in the year 2012. Similarly, the partition 114 might include date_ids for dates that occur in the year 2013.

The Orders table 120 includes rows that correspond to unique customer orders. The Orders table 120 has columns including a unique Order_id for each row. Each row also includes a date_id, which is a foreign key into the Date Dimension table 110 corresponding to the date of the order. Each row also includes an item, an amount, and a customer name.

The Orders table 120 is partitioned by the foreign key date_id. Thus, the partition 122 might include date_ids between 6000 and 6999. Similarly, the partition 124 might include date_ids between 8000 and 8999.

Tables can be partitioned both logically and physically. For example, a storage subsystem can further partition a logical partition into multiple physical partitions. An underlying storage subsystem can receive a request for a logical partition and return data of all physical partitions of the logical partition in response to the request. In the examples below, when a type of partitioning is not mentioned, it will be assumed for simplicity that a partition refers to a logical partition, which in practice may be further physically partitioned as well.

A table T over a schema of attributes $\{A_1, \ldots, A_n\}$ is a set of tuples of values of the attributes. A table T is logically partitioned by a partitioning key attribute pk in $\{A_1, \ldots, A_n\}$ if there exists a partitioning function $f_T$ that maps a tuple t to a partition $T_i$ in a set of partitions $\{T_1, \ldots, T_n\}$ according to the value of the partitioning key pk in the tuple t. The partitioning function $f_T$ may also output a reserved value for an invalid partition, e.g., −1.

Common partitioning functions include range-based or category-based partitioning functions. For example, when year in the Orders table 120 is used as the partitioning key pk, a system can define the following range-based partitioning function:

$$f_T(\text{year}) = \begin{cases} T0: \text{year} \leq 1980, \\ T1: \text{year} = 1981, \\ \ldots \\ T33: \text{year} \geq 2013 \end{cases} \quad (1)$$

which outputs an identifier for a partition $T_i$ depending in which range year falls. As another example, a system can define the following category-based partitioning function that is based on the value of an order_status attribute of tuples in the Orders table 120:

$$f_T(\text{order\_status}) = \begin{cases} T1: \text{order\_status} = \text{``canceled''}, \\ T2: \text{order\_status} = \text{``complete''}, . \\ T3: \text{order\_status} = \text{``pending''} \end{cases} \quad (2)$$

A user can obtain information about customer orders that occurred during the last quarter of 2013 by issuing the query shown in Table 1 to a distributed database system:

select * from Orders s, Date_dim d
where d.month between 10 and 12, d.year=2013, and d.date_id=s.date_id;

Table 1

To satisfy the query in Table 1, the system can perform a join operation between the Date Dimension table 110 and the Orders table 120. In other words, to satisfy the query the system identifies rows in the Orders table 120 having a date_id that matches a date_id of a row in the Date Dimension table 110 having values of the month attribute that satisfy a first predicate expression "d.month between 10 and 12" and having values of the year attribute that satisfy a second predicate expression "d.year=2013."

The system needs to scan tuples in the Date Dimension table 110 in order to determine the values of date_id that satisfy the first and second predicate expressions. However, because the Date Dimension table 110 is partitioned by year, the system need not scan every partition of the Date Dimension table 110 to compute a valid result for the query.

To support dynamic partition selection, a system can implement a partition selection function $f^*_T$, which, for a given predicate expression on a partitioning key pk, returns zero or more partition identifiers of partitions having tuples that may satisfy the predicate expression. For example, when the Date Dimension table 110 is partitioned by the partitioning key year, a partition selection function $f^*_T$ can receive a predicate expression "year=2013" and output the following partition identifier: T33. The system can then scan only the single partition T33 of the Date Dimension table 110 rather than all the partitions of the Date Dimension table 110.

After obtaining the values of date_id that satisfy the predicate expressions, the system can compute a result for the join operation by finding tuples in the Orders table 120 having matching values of date_id. Because the Orders table 120 is partitioned by date_id, the system may not need to scan every partition of the Orders table 120. For example, the system need not scan the rows of partition 122 at all in order to satisfy the query because the date_ids for the partition 122 correspond to orders that occurred in 2012. However, because the Orders table 120 is partitioned by date_id, the system generally cannot eliminate any of the partitions of the Orders table 120 from consideration at query planning time.

Instead, the system can only eliminate these partitions from consideration at query runtime. In other words, the system first scans the Date Dimension table 110 at query runtime in order to determine the date_ids of rows having month and year attributes that satisfy the predicate expressions in the query. Only after obtaining the values of these date_ids can the system dynamically eliminate from consideration rows from the Orders table 120 that will not have matching values of date_id.

The system can use the scanned values of date_id as input to a partition selection function $f^*_T$ for the Orders table 120. The partition selection function $f^*_T$ for the Orders table 120 might then output a single partition identifier for the partition 124. The system can then scan only partition 124 to compute a result for the query. Thus, by using dynamic partition selection, the system is able to compute a result for the query by scanning only one partition of the Date Dimension table 110 and only one partition of the Orders table 120.

In this specification, dynamic partition selection means that a system can select partitions at query runtime based on a partial result computed for a query. Typically, this includes the system reading at least some tuples from an underlying storage subsystem and selecting partitions based on values in the tuples according to a partition selection function, which may take as input one or more predicate expressions.

FIG. 1B illustrates multilevel table partitioning. A system can implement multilevel table partitioning by using multiple partitioning keys for a table. The Orders table 140 is partitioned by a first partitioning key on the year attribute, resulting in a first top-level partition 150 for orders occurring in 2012 and a second top-level partition 160 for orders occurring in 2013.

Each top-level partition is further partitioned by a second partitioning key on the region attribute. Thus, the first top-level partition 150 includes a first, second-level partition 152 for a first region of orders occurring in 2012 and a second, second-level partition 154 for a second region of orders occurring in 2012. Similarly, the second top-level partition 160 includes a third second-level partition 162 for a first region of orders occurring in 2013 and a fourth second-level partition 164 for a second region of orders occurring in 2013.

Each level is partitioned on a different partitioning key. Thus, a system can implement dynamic partition selection for multilevel partitioned tables by supporting a partition selection function $f^*_T$ that accepts predicate expressions on any of the partitioning keys for the table and outputs the partition identifiers of any leaf-level partitions that may include tuples satisfying the predicate expression.

For example, a partition selection function $f^*_T$ for the Orders table 140 can accept a predicate expression on the first partitioning key, e.g., "year=2012," resulting in the output of partition identifiers for the partitions 152 and 154. The partition selection function $f^*_T$ can also accept a predicate expression on the second partitioning key, e.g., "region=1," resulting in the output of partition identifiers for the partitions 152 and 162. The partition selection function $f^*_T$ can also accept any appropriate combination of predicate expressions on both the first and second partitioning keys, e.g., "year=2012 and region=2," resulting the output of the partition identifier for the partition 154.

FIG. 2 is a diagram of an example system 200. The system 200 is an example of a computing system that can implement dynamic partition selection.

The distributed system 200 includes a master node 212 and multiple segment nodes 214a, 214b, through 214n. The master node 212 and each segment node 214a-n are implemented as one or more physical computers or as software installed as a virtual machine on a physical computer. The master node 212 and the segment nodes 214a-n are connected by one or more communications networks, e.g., a local area network or the Internet. The master node 212 assigns each segment node to operate on a portion of data stored in the distributed system 200.

For example, the master node 212 has assigned the segment node 214a to operate on a first partition 242 of a first database table stored in a first storage subsystem 232. Similarly, the master node 212 has assigned the segment node 214b to operate on a second partition 244 for the first database table, stored in a second storage subsystem 234, and the master node 212 has assigned the segment node 214n to operate on a first partition 246 of a second database table stored in an third storage subsystem 236.

A user of a user device 202 can access data stored in the distributed system 200 by communicating with the master node 212. The master node 212 coordinates with the segment nodes 214a-214n to respond to requests for data from the user device 202. The user device 202 can issue a query, e.g., in structured query language (SQL) or object query language (OQL), to the master node 212.

The master node 212 communicates with the segment nodes 214a-214n to obtain data that satisfies the query. The master node 212 can divide the processing among N segment nodes, e.g., the segment nodes 214a-n. The segment nodes can access data in an underlying distributed storage system, for example, the Hadoop File System (HDFS).

When the master node 212 receives a query, the master node 212 parses the query and generates a query plan. The query plan defines the operations that the master node 212 will distribute to the segment nodes to fulfill the query. The master node 212 may access a system catalog and perform cost estimations and optimization algorithms to determine a query plan that reduces the cost, e.g., processing time and network bandwidth required, for computing a result for the query. Functionality of the master node 212 may be implemented by multiple software modules performing different functions, for example, a query parser and a query planner.

Figure 3:
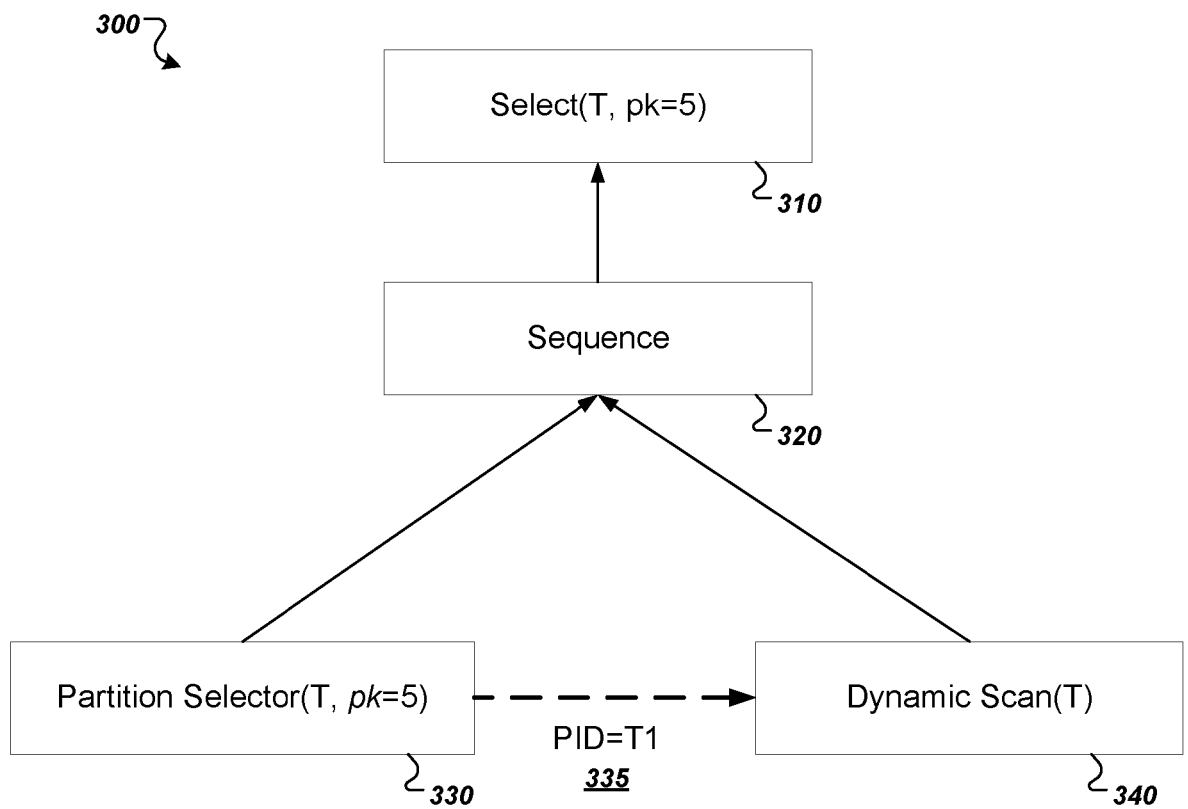
FIG. 3 is a diagram of an example query plan that includes a dynamic partition selector and a select operator.

FIG. 3 is a diagram of an example query plan 300 that includes a dynamic partition selector and a select operator 310. A master node of a distributed system can implement a query planner that parses the query and generates multiple candidate query plans. The query planner can evaluate each of the candidate query plans to select a query plan that is the most efficient in terms of scanning time, intermediate storage required, or overall computation time.

A query plan generally specifies a sequence of operations to be performed by computing nodes in a system. The query plan specifies the order of the operations and the data flow between the operations using abstract operators.

An abstract operator represents one or more operations to be performed by a particular computing node in order to compute a result for the query. Thus, if an operator is described as performing an action or providing data to another operator, the action will actually be performed by a computing node executing the operations of the operator or providing data to another computing node executing the operations of the other operator.

The operators are abstract operators because they are independent of the implementation details of any particular data storage subsystem or data storage format. Thus, the abstract operators represent operations that can be performed by any appropriate system.

Furthermore, the operators are abstract because they need not represent the allocation of actions among physical computing nodes. In other words, the operators of two operators can be performed by the same computing node or even within the same process on a single computing node. In addition, some operators are required to be performed within the same process on a single computing node.

A query plan can be represented as a graph, with the graph nodes representing operators and edges between the graph nodes representing data being communicated between computing nodes that are executing the operators.

One example operator is a scan operator. A scan operator represents a request for tuples from a particular table. In other words, the scan operator represents one computing node requesting another computing node, possibly the same computing node, to obtain tuples of the particular table from a storage subsystem and to return the obtained tuples.

Another example operator is a select operator. A selector operator represents a filtering of tuples by a particular predicate expression. When a select operator is annotated with a predicate expression, a computing node will receive tuples as input and output only tuples that satisfy the predicate expression.

In FIG. 3, the query plan 300 is represented as a graph and includes at the root of the graph a select operator 310. The select operator 310 represents a computing node requesting tuples from the table T. The select operator 310 is also annotated with the predicate expression "pk=5."

A system can fulfill the request by the select operator 310 using a table scan operator that reads all tuples for all partitions of the table. However, the system can improve scanning time performance by fulfilling the request of the select operator 310 using operators including a partition selector 330 and a dynamic scanner 340.

The partition selector 330 receives the name of the table T and the predicate expression from the select operator 310. The partition selector 330 may also have an identifier that matches an identifier of the dynamic scanner 330. The system can use the matching identifiers to indicate corresponding partition selector/dynamic scanner pairs in case the query plan includes multiple partition selectors and dynamic scanners.

The partition selector 330 provides the predicate expression as input to a partition selection function $f^*_T$ for the table T to obtain one or more identifiers of partitions that may include tuples satisfying the predicate expression.

For example, if the table is partitioned according to the range-based partitioning function in equation (1), the partition selection function $f^*_T$ will return only the partition identifier T1 for the predicate key. Thus, the partition selector 330 can provide the identifier 335 of the partition T1 to the dynamic scanner 340.

The dynamic scanner 340 receives the identifier 335 of the partition T1 and obtains from storage the tuples for the partition T1. Other partitions of the table T are not scanned at all, which can dramatically improve scan time performance of the system.

The dynamic scanner 340 provides its output of tuples from the partition T1 to its parent operator, which is a sequence operator 320. The sequence operator 320 orders the operations between its two or more child operators and returns the output of the last operator.

The sequence operator 320 ensures that the partition selector 330 is executed before the dynamic scanner 340, and returns the output of the dynamic scanner 340. Thus, the sequence operator 320 returns the tuples from the partition T1 to the select operator 310.

When a partition selector has no child operators, the partition selector provides partition identifiers to a corresponding dynamic scanner but does not return any data to its parent operator. Thus, in FIG. 3, the edge between the sequence operator 320 and the partition selector 330 indicates that the sequence operator 320 enforces an ordering between the partition selector 330 and the dynamic scanner 340. However, the partition selector 330 does not return any data to the sequence operator 320.

When a partition selector has a child operator, the partition selector both provides partition identifiers to the corresponding dynamic scanner and also returns the output of its child operator to its parent operator.

Because of the dynamic partition selection performed by the partition selector 330 and the dynamic scanner 340, the select operator 310 receives only tuples from the partition T1. The select operator 310 can then apply the predicate expression on the received tuples to return only tuples having values that satisfy the predicate expression.

Figure 4:
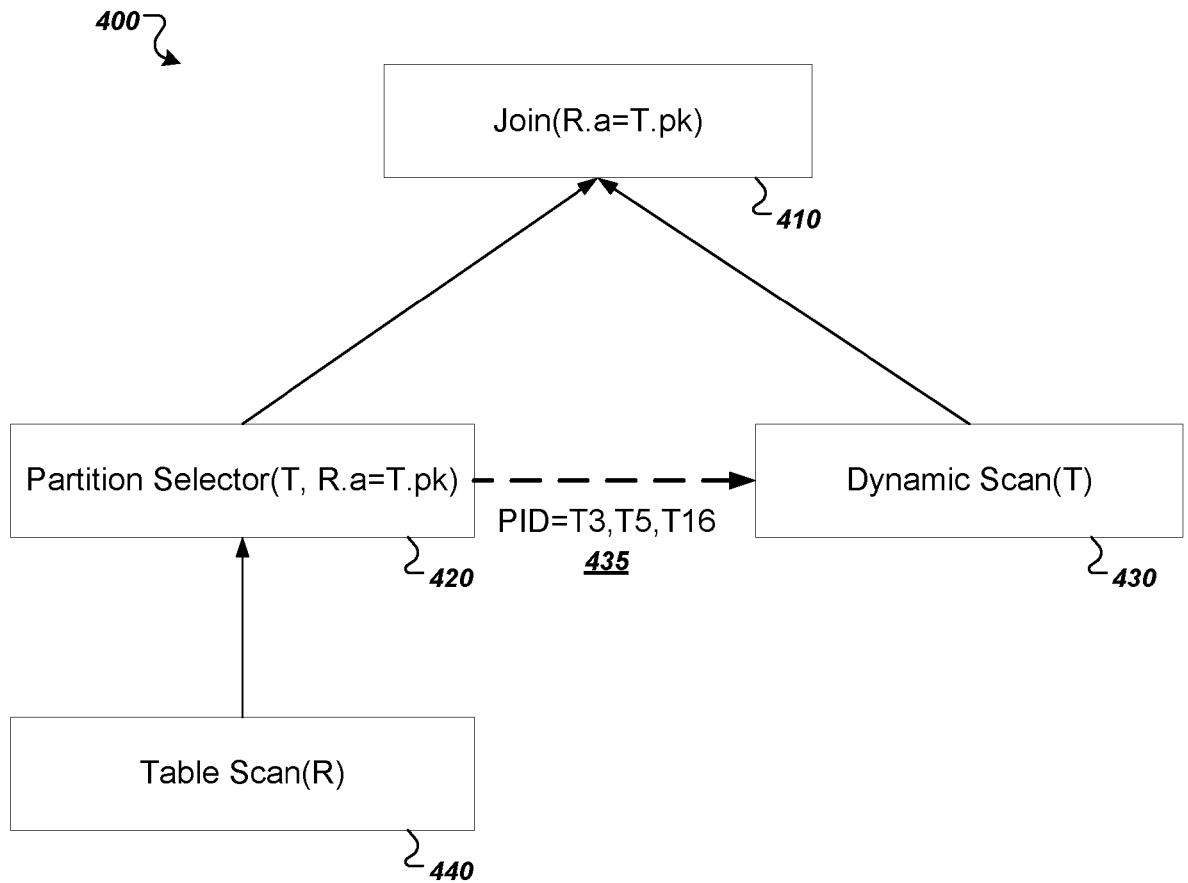
FIG. 4 is a diagram of an example query plan that includes a dynamic partition selector and join operator.

FIG. 4 is a diagram of an example query plan that includes a dynamic partition selector and join operator 410. The join operator 410 computes tuples from the table R having attribute values a that match attribute values of the partitioning key pk of tuples in the table T. The table T is partitioned by the partitioning key pk. The table R may or may not be partitioned.

The partition selector 420 receives tuples from a table scan operator 440. The table scan operator 440 obtains from storage all tuples from the table R.

The partition selector 420 receives the name of the table T from its parent, the join operator 410, and receives the tuples from the table R from the table scan operator 440.

In order for tuples of the table T to occur in the result of the join operator 410, the value of the partitioning key of the tuples must match the values of the attribute a of tuples from the table R. Thus, the system can selectively scan the table T using the partition selector 420 and the dynamic scanner 430 to read from storage only partitions of the table T that may include tuples having matching values of the partitioning key attribute.

To do so, the partition selector 420 provides the values R.a of the tuples from R to a partition selection function $f^*_T$ for the table T. The partition selection function $f^*_T$ for the table T thus returns identifiers of partitions of T that may include tuples having predicate key values that match the R.a values. In this example, the partition selector 420 provides only the identifiers 435 of the partitions T3, T5, and T16 of T to the dynamic scanner 430.

The dynamic scanner 430 receives the identifiers 435 of the partitions T3, T5, and T16 and obtains from storage the tuples for those partitions. Other partitions of the table T are not scanned.

The dynamic scanner 430 provides its output of tuples from the partitions T3, T5, and T16 to its parent join operator 410. The partition selector 420, since it has one child, provides the output of its child operator to the join operator 410.

In the case of a join operation, a sequence operator that enforces an order between a partition selector and its corresponding dynamic scanner may not be necessary because a join operator may implicitly require its outer child to be executed before its inner child.

The join operator 410 thus receives all the tuples from the table R and only tuples from the partitions T3, T5, and T16 of the table T. The join operator 410 can then compute a valid join result, even though only three partitions of table T were scanned.

In this example, the table R may be referred to as the outer table of the join and the table T may be referred to as the inner table of the join, because the system reads all tuples of the table R and the compares them to only some tuples of the table T. The partition selector 420, by generating all tuples of the table R, can thus be referred to as an outer child of the join operator 410, and the dynamic scanner 430 can thus be referred to as an inner child of the join operator 410.

The system can alternatively place both the partition selector 420 and the dynamic scanner 430 on the inner side of the join operator 410. For example, the system can include a sequence operator as the inner child of the join operator 410, e.g., on the right-hand side of the query plan 400, with the sequence operator having the partition selector 420 and dynamic scanner 430 as children.

However, typically the system cannot place the dynamic scanner 430 on the outer side of the join operator 410, e.g., on the left-hand side, and place the corresponding partition selector 420 on the inner side of the join operator 410. In some systems, this query plan will cause deadlock as both operators would wait for the other to finish. In addition, in some systems this query plan may produce wrong results as the dynamic scanner 430 may begin scanning before any partitions have been selected by the partition selector 420. Thus, the system can ensure that such a candidate query plan is discarded upon evaluation or is not generated as a candidate.

Figure 5:
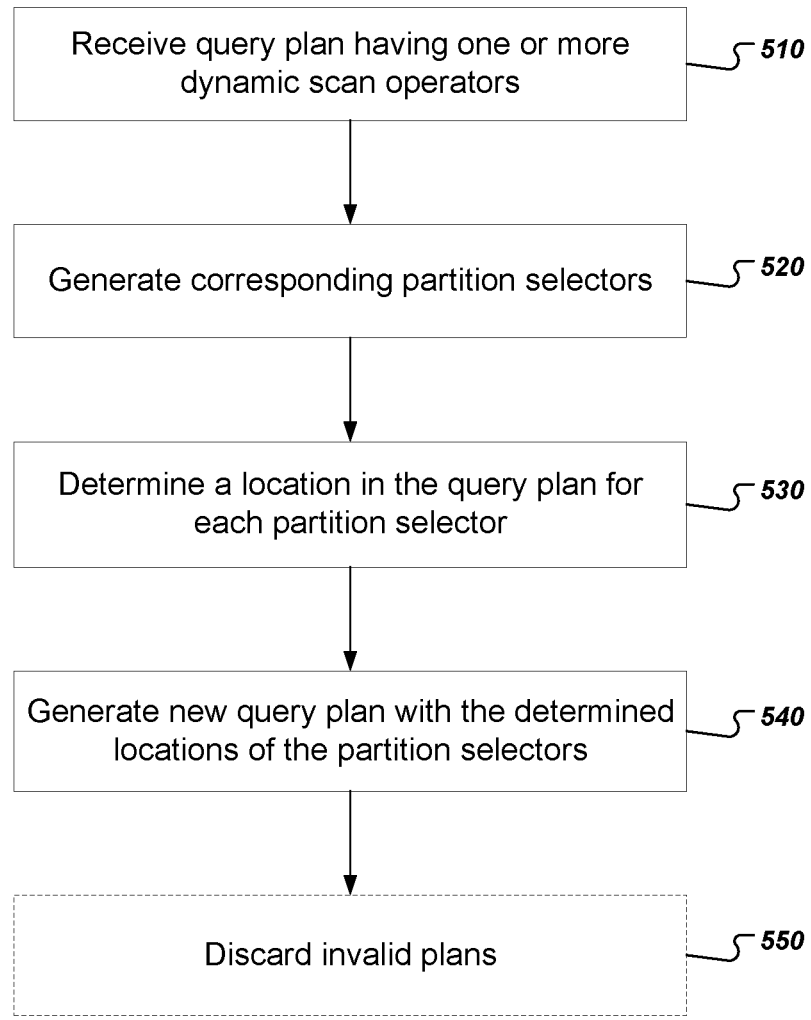
FIG. 5 is a flow chart of an example process for placing partition selector operators into a query plan.

FIG. 5 is a flow chart of an example process for placing partition selector operators into a query plan. A query planner of a master node can generate a variety of different query plans. For tables that have been partitioned, the query planner can generate query plans that include dynamic scanners that scan only partitions selected at runtime rather than full table scanners. The system must then choose the appropriate placement of a corresponding partition selector for each dynamic scanner in the query plan. The process can be implemented by one or more computer programs installed on one or more computers. The process will be described as being performed by a system of one or more computers, e.g., the master node 212 of FIG. 2.

The system receives a query plan having one or more dynamic scan operators (510). The query plan may represent only a portion of an overall query plan for computing a result for the query. The system can receive the query plan as part of an optimization request that is specific to a subtree of the query plan. For example, the optimization request can be made on behalf of one of the operators in a full query plan.

An optimization request for a query plan can specify one or more properties or constraints. For example, an optimization request can enumerate a number of alternative query plans that are computationally equivalent but differ according to different methods for distributing data among multiple nodes, using dynamic partition selection, and constraints on operator co-location, to name just a few examples.

A system can spawn multiple processes in parallel to handle optimization requests for different portions of a query plan. Each of the multiple processes may additionally spawn other processes for optimizing other portions of the query plan rooted at descendant operators.

As part of the optimization request, the system can generate an alternative query plan that uses dynamic partition selection. For example, the system can generate a query plan that replaces a regular table scan operator with a dynamic scan operator. The system can then place a corresponding dynamic partition selector, ensuring that the resulting new query plan meets the constraints of the optimization request, and evaluate the query plan against other candidate query plans.

When receiving a query plan with dynamic partition selection requested, the system can first traverse the query plan to identify dynamic scan operators inserted into the query plan. In general, each dynamic scan operator encountered in the query plan will need a corresponding partition selector. The corresponding partition selector will provide the dynamic scan operator with identifiers of partitions to scan.

Figure 6A:
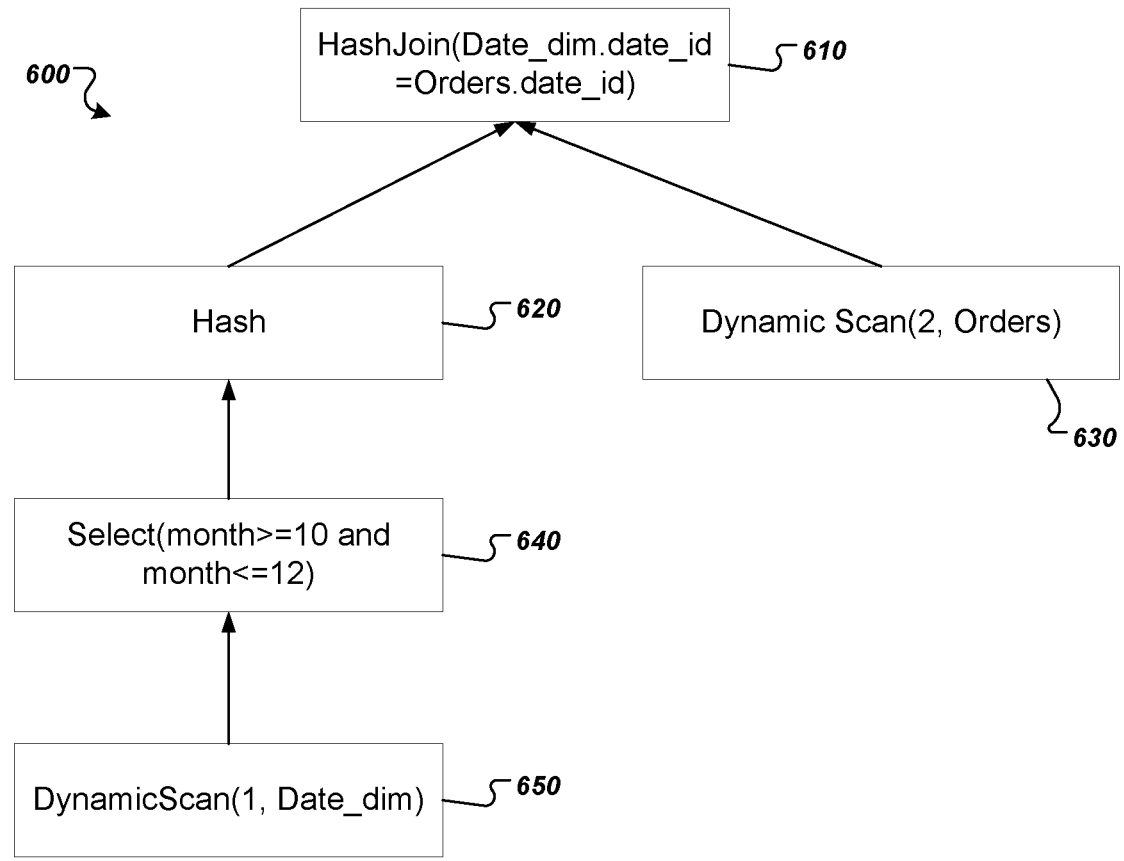
FIG. 6A illustrates a query plan before partition selectors have been placed.

FIG. 6A illustrates a query plan 600 before partition selectors have been placed. The query plan 600 is an example of a query plan for computing a result for the query shown in Table 1, which obtains orders from the Orders table 110 that were placed during the last quarter.

The first dynamic scanner 650, with an identifier of 1, performs a dynamic scan on one or more partitions of the Date Dimension table. The system will thus need to place a corresponding partition selector in the query plan, which will compute and provide the first dynamic scanner 650 with the identifiers of partitions of the Date Dimension table to be scanned.

A second dynamic scanner 630, with an identifier of 2, performs a dynamic scan on one or more partitions of the Orders table. The system will thus need to place a second corresponding partition selector in the query plan, which will compute and provide the second dynamic scanner 630 with identifiers of partitions of the Orders table to be scanned.

The first dynamic scanner 650 provides tuples to the select operator 640, which then passes tuples having a month attribute between 10 and 12 to a hash operator 620. The hash operator 620 constructs a hash table that assigns each tuple received from the select operator to a particular cell. The hash operator 620 can assign tuples to cells of the hash table by hashing the value of the Date_dim.date_id attribute to be compared by the hash join operator 610.

The hash join operator 610 receives the hash table from the hash operator 620 and the tuples from the second dynamic scanner 630. The hash join operator 610 can efficiently compute a result for the join by hashing the value of the Orders.date_id attribute and returning all Date_dim tuples in the resulting hash table cell.

As shown in FIG. 5, the system generates corresponding partition selectors (520). The system can generate a respective partition selector for each dynamic scan operator in the query plan. The system can use identifiers of dynamic scan operators to determine to which dynamic scan operator a particular partition selector corresponds. Thus, for the first dynamic scanner 650 with the identifier of 1, the system can generate a corresponding partition selector having an identifier of 1. And for the second dynamic scanner 630 with an identifier of 2, the system can generate a corresponding partition selector having an identifier of 2.

Generally, while a partition selector can be annotated with a predicate expression for selecting partitions, the system initially generates partition selectors that do not have such predicate expressions. Instead, the system can annotate partition selectors with predicate expressions as the partition selectors are pushed to various nodes of the query plan, which will be described in more detail below with reference to FIGS. 7-10.

The system determines a location in the query plan for each partition selector (530). In order to reduce scanning time and the amount of data transferred between nodes, the system will generally select a location for each partition selector that results in eliminating partitions from consideration, as well as eliminating partitions at the earliest possible point during execution of the query plan.

In some implementations, the system recursively traverses operators in the query plan. For example, the system can start at a particular operator that initiated the optimization request. At each current operator being evaluated, the system generates a set of partition selectors that should be should be placed on top of the current operator, e.g., added to the query plan as a parent node of the current node, and a respective set of partition selectors that should be pushed down to one or more child operators of the current operator.

The system can push a particular partition selector down to a child operator by recursively calling the same function with the particular partition selector and the child operator as parameters. In other words, the system will perform the same logic on the child operator, e.g., whether the partition selector should be placed on top of the child operator or pushed further down to a child of the child operator. The system can continue this process until all partition selectors have been placed in the query plan.

The system generates a new query plan with the determined locations of the partition selectors (540). The system can generate a query plan that includes each of the partition selectors as operator nodes in the query plan depending on to which operator node the partition selector was pushed.

Figure 6B:
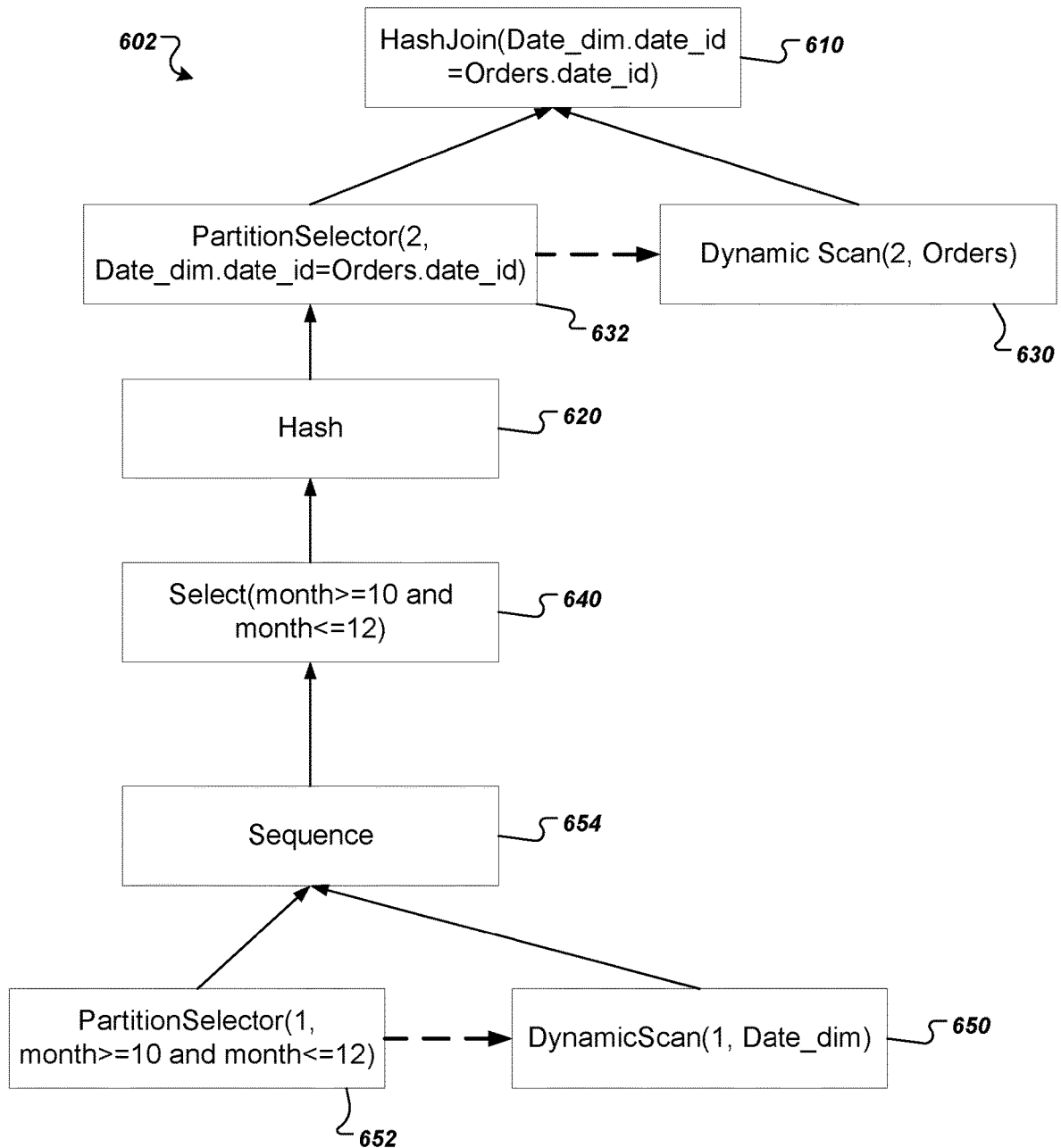
FIG. 6B illustrates a new query plan after partition selectors have been placed.

FIG. 6B illustrates a new query plan 602 after partition selectors have been placed.

The system placed the first partition selector 652 below the select operator 640. In the process, the system annotated the first partition selector 652 with the predicate expression from the select operator 640. The first partition selector 652 can thus use the predicate expression to generate partition identifiers to be provided to the first dynamic scanner 650 during query execution.

In this example, the first partition selector 652 can provide the predicate expression "month>=10 and month<=12" to a partition selection function $f*_{Date\_dim}$ for the Date Dimension table. The partition selection function $f*_{Date\_dim}$ will output identifiers of partitions of the Date Dimension table that may include tuples having month attribute values that satisfy the predicate expression.

The system placed the second partition selector 632 below the hash join operator 610. In the process, the system annotated the second partition selector 632 with the predicate expression from the hash join operator 610. The second partition selector 632 can thus use the predicate expression to generate partition identifiers to be provided to the second dynamic scanner 630 during query execution.

In this example, the second partition selector 632 will receive a hash table from the hash operator 620, where the hash table is hashed by Date_dim.date_id. The second partition selector 632 can use the values of the Date_dim.date_id of tuples that occur in the hash table as input to a partition selection function $f*_{Orders}$ for the Orders table. The partition selection function $f*_{Orders}$ for the Orders table will output identifiers of partitions of the Orders table that may include tuples having date_dim attribute values that match the input Date_dim.date_id values.

As shown in FIG. 5, after generating the new query plan with the partition selectors having been placed, the system optionally discards invalid plans (550). As mentioned above, the optimization request can include properties and constraints that must be fulfilled in order to be a valid plan.

One property that the system can enforce for dynamic partition selection is process co-location. In other words, the system can require that a particular partition selector and corresponding dynamic scanner pair be executed within the same computing process of the same computing node.

Figure 6C:
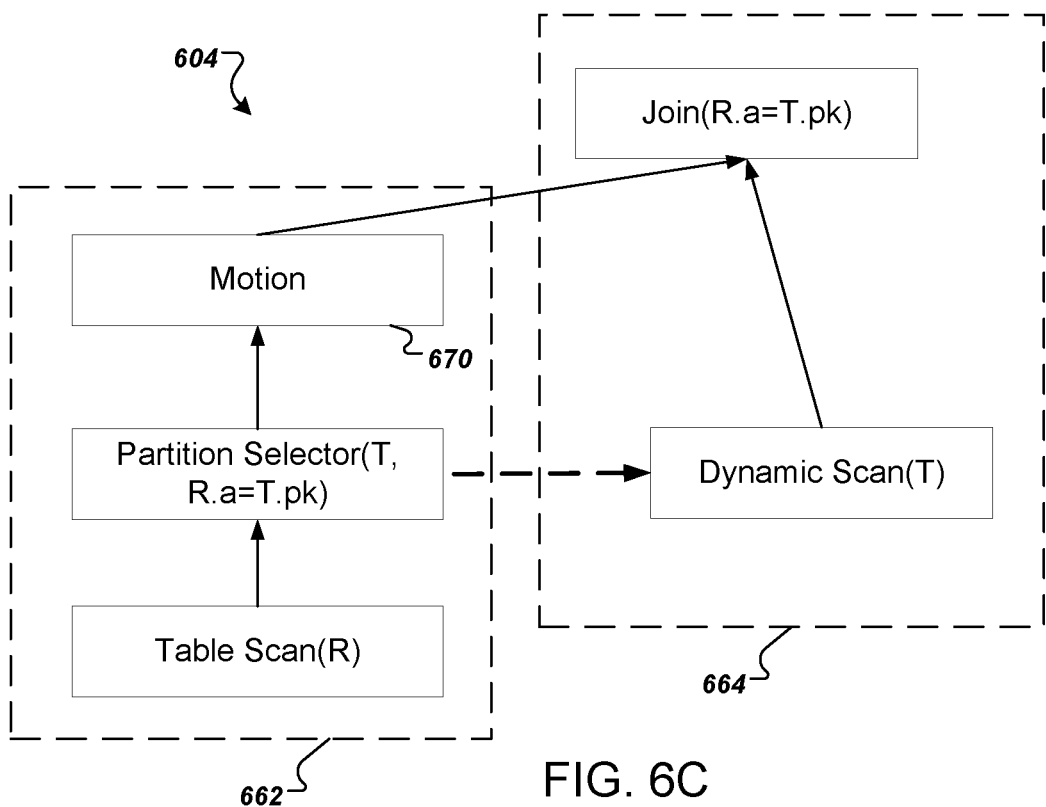
FIG. 6C illustrates a query plan having a partition selector and a dynamic scanner in different processes.

FIG. 6C illustrates a query plan 604 having a partition selector and a dynamic scanner in different processes. The system can enforce inter-process communication in a number of ways. For example, the system can use a motion operator that acts as a boundary between two active processes. Thus, the motion operator transfers the output of an operator being executed by one process to an operator being executed by another process.

The boundary 662 and the boundary 664 represent process boundaries for two processes executing operators of the query plan 604. The motion operator 670 represents a boundary between the two processes.

Because the partition selector and the corresponding dynamic scanner are in different processes, the system can discard the query plan 604 as an invalid query plan. In other words, the system can ensure that for any particular partition selector and its corresponding dynamic scanner, no motion operator can exists between the partition selector, the corresponding dynamic scanner, and their closest common ancestor.

Figure 6D:
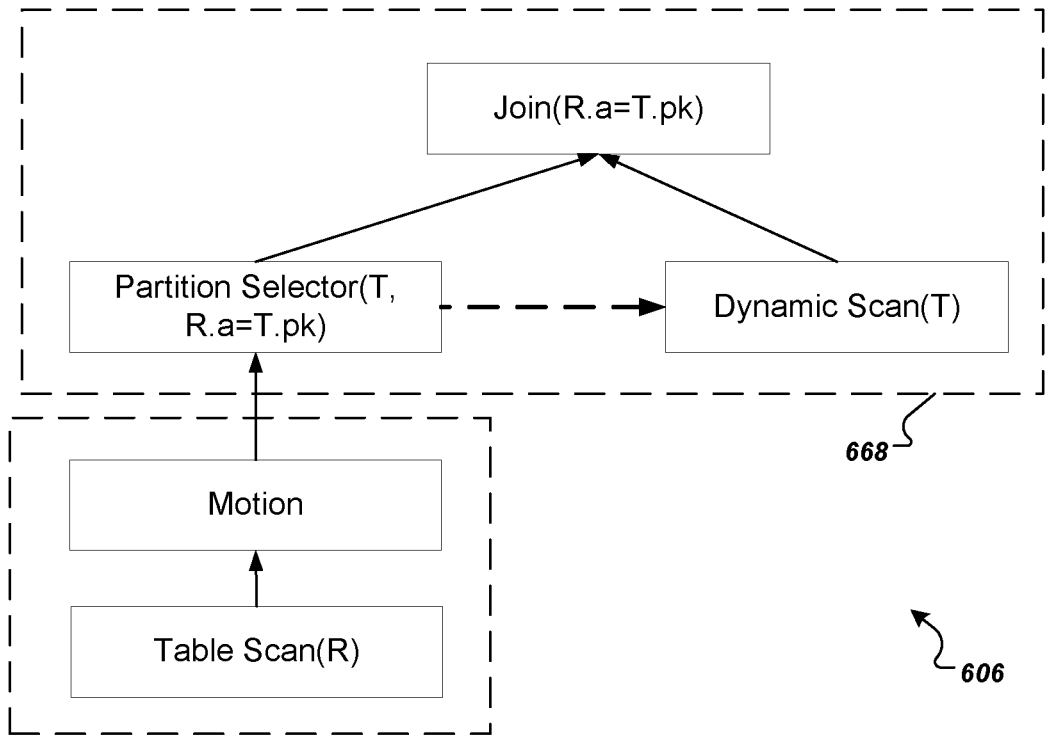
FIG. 6D illustrates a query plan having a partition selector and a dynamic scanner in the same process.

FIG. 6D illustrates a query plan 606 having a partition selector and a dynamic scanner in the same process. The partition selector and dynamic scanner in FIG. 6D are both located within a same process boundary 668. Thus, the system can keep the query plan 606 as a valid alternative plan and evaluate the new query plan against other candidate query plans. In doing so, the system can consider the likely scanning time and data transfer improvements of using dynamic partition selectors in the query plan.

Figure 7:
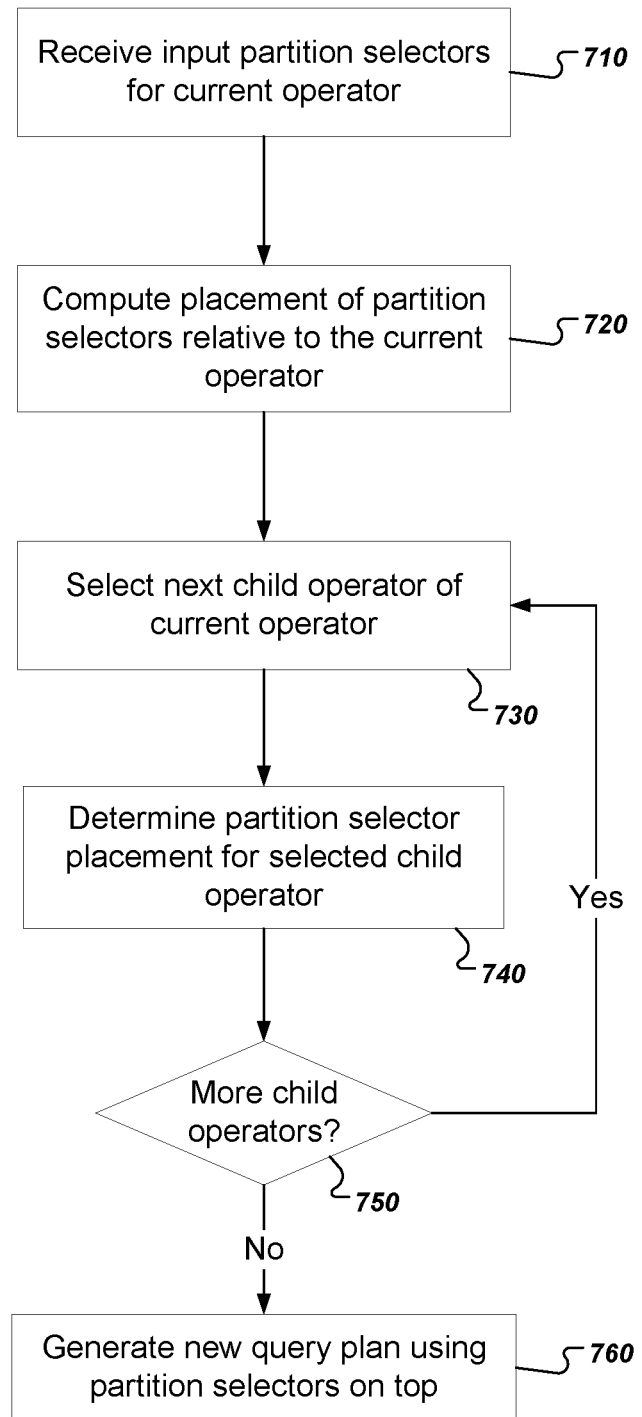
FIG. 7 is a flow chart of an example process for placing partition selectors in a query plan.

FIG. 7 is a flow chart of an example process for placing partition selectors in a query plan. In general, the system receives a partition selector for each dynamic scanner in the query plan. The system can determine the placement of partition selectors in the query plan by determining, at each operator in the query plan, whether a partition selector should be a parent of the operator or pushed to one of the operator's children. The process can be implemented by a source code function that is called recursively for each operator in the query plan. The process will be described as being performed by a system of one or more computers, e.g., the master node 212 of FIG. 2.

The system receives input partition selectors for a current operator (710). Each partition selector has a particular identifier that indicates which dynamic scanner corresponds to the partition selector. The partition selector may also be annotated with one or more predicate expressions for dynamically selecting partitions. In some implementations, at the root node of the query plan, the system begins with partition selectors that are not annotated with predicate expressions.

The system computes a placement of partition selectors relative to the current operator (720). Generally, the system will compute which partition selectors to place on top of the current operator and which partition selectors to push to each of the current operator's children.

Figure 8:
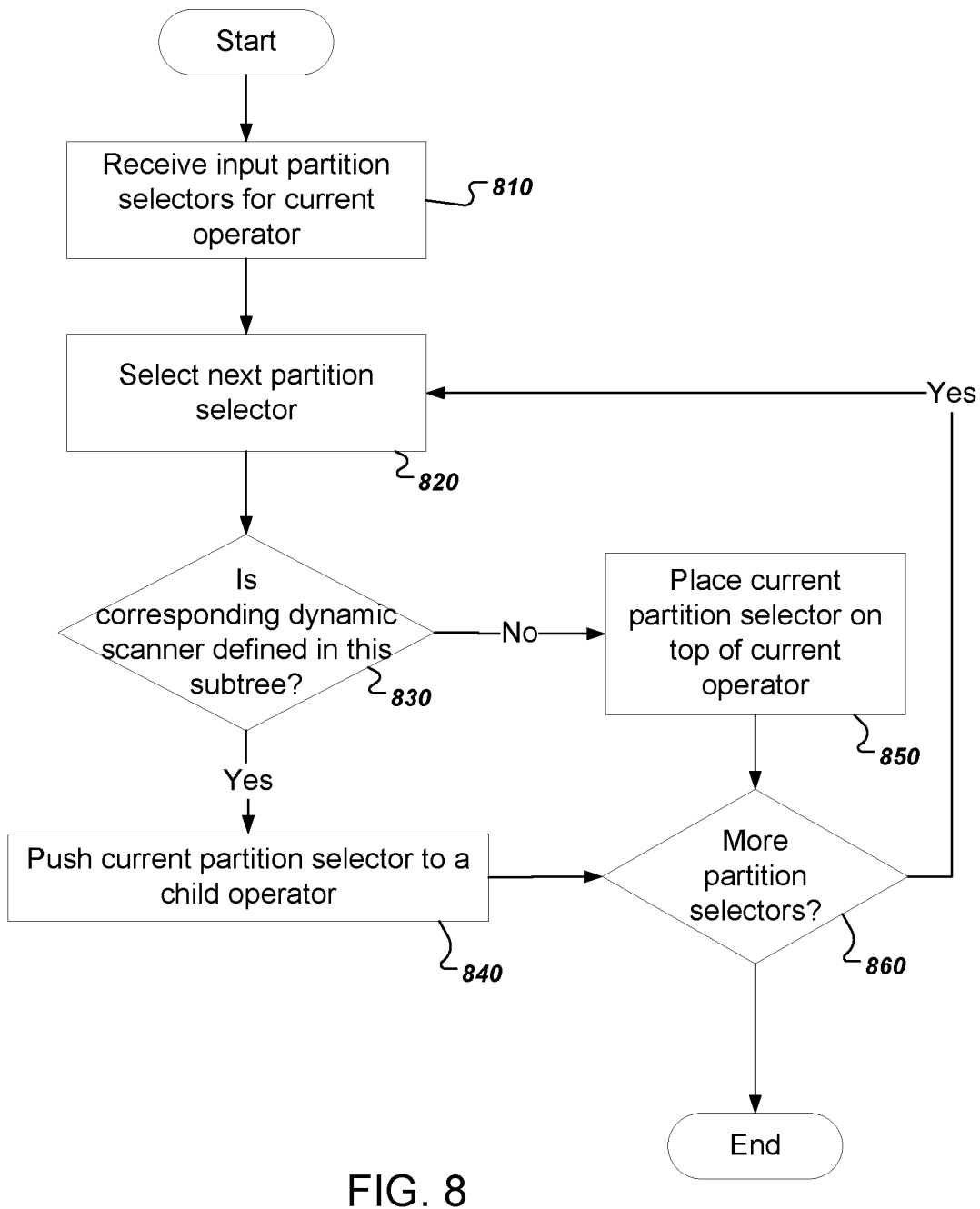
FIG. 8 is a flow chart of an example default process for computing the placement of partition selectors relative to a current operator.
Figure 9:
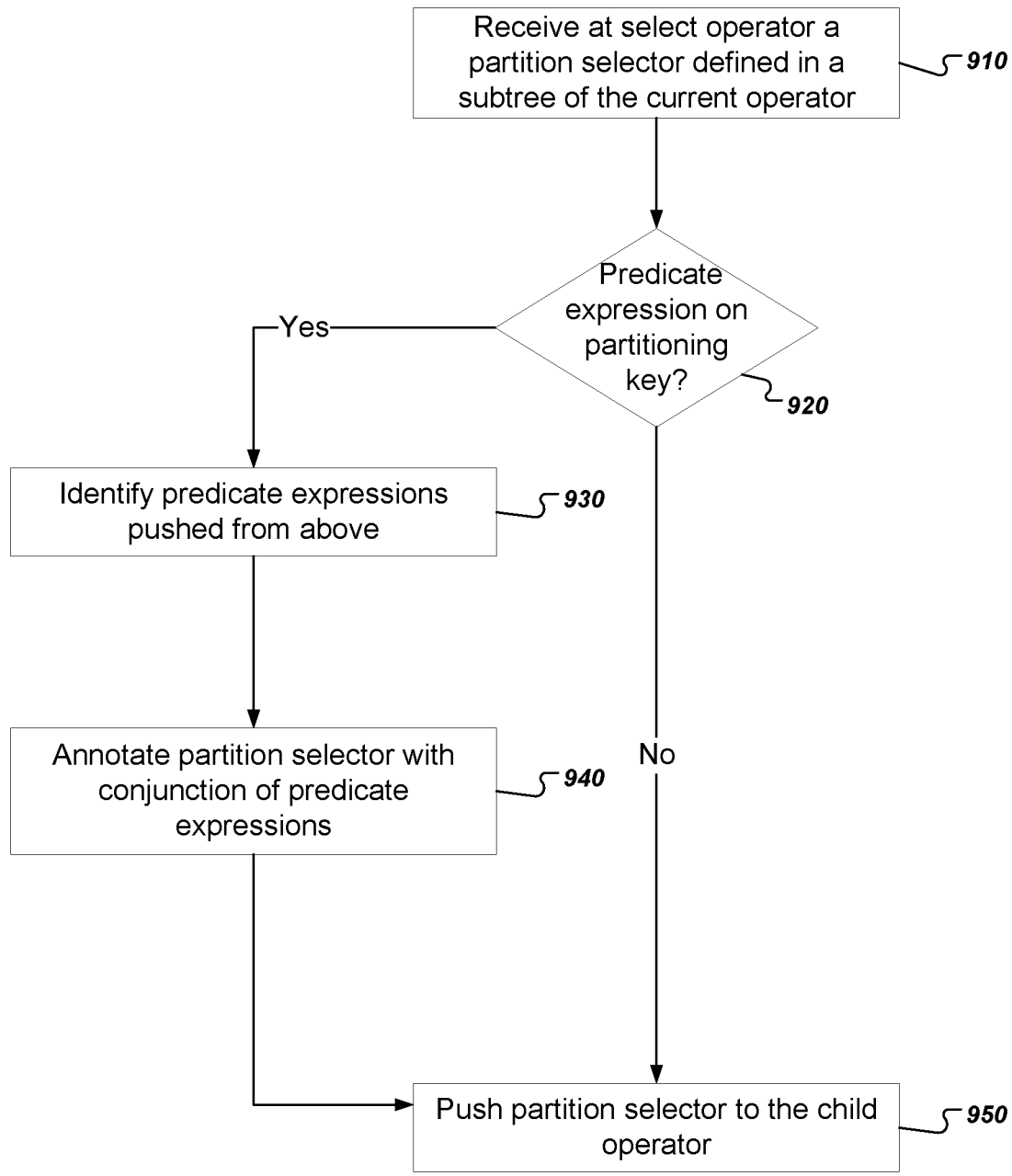
FIG. 9 is a flow chart of an example process for computing the placement of partition selectors relative to a select operator.
Figure 10:
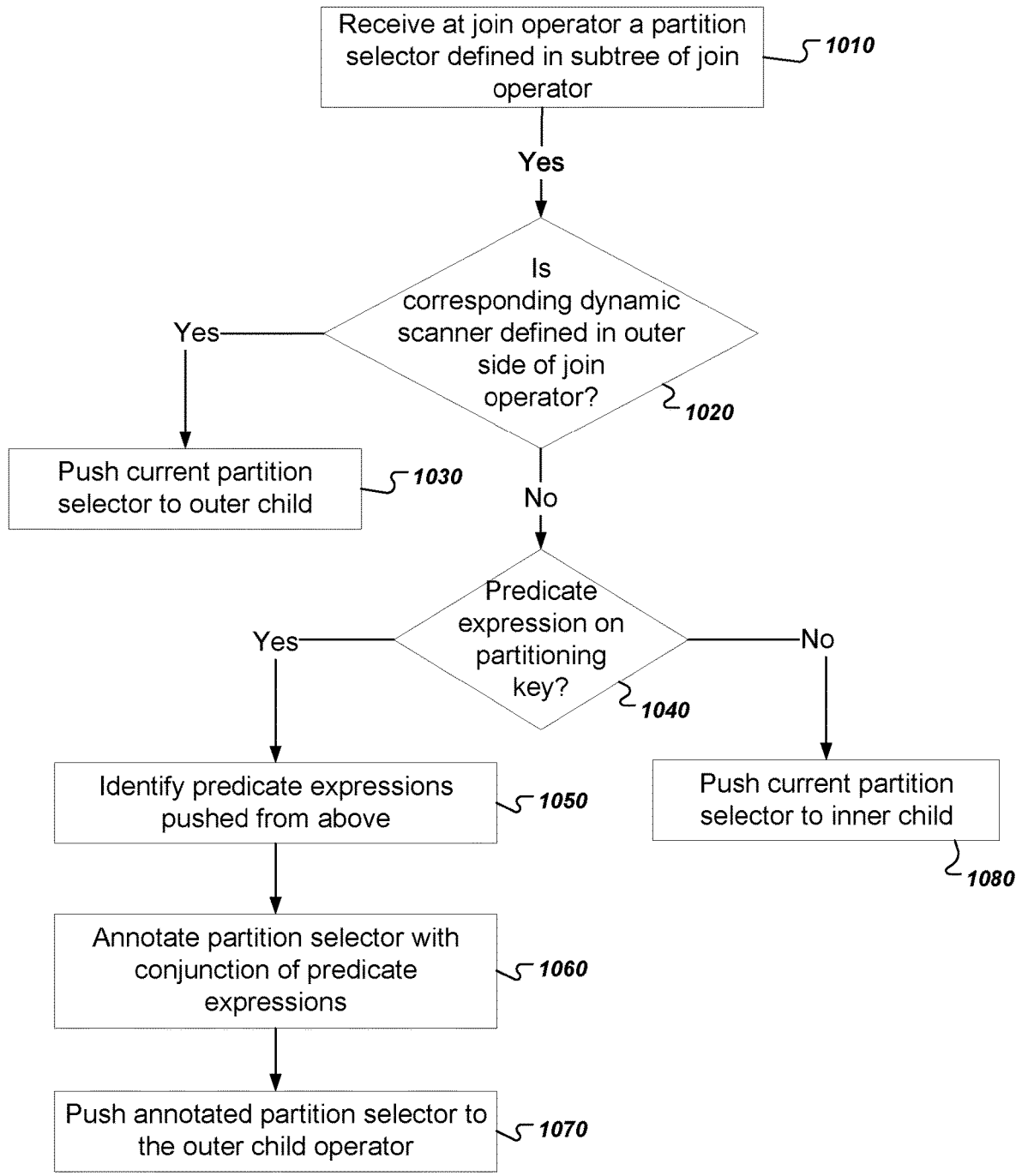
FIG. 10 is a flow chart of an example process for computing the placement of partition selectors relative to a join operator.

The system can generally use different logic for each particular type of operator in determining whether to place a partition selector on top of the current operator or push the partition selector to one of the children. FIGS. 8-10 illustrate, for select, join, and other operators, operator-specific processes for computing where to place partition selectors.

The system selects a next child operator of the current operator (730). After computing the placement of partition selector relative to the current operator, each partition selector that was not placed on top of the current operator will be pushed to one of the current operator's children.

The system determines partition selector placement for the selected child operator (740). In some implementations, the system recursively calls a function that implements the process of FIG. 7, passing as parameters one or more partition selectors that were not placed on top of the current operator. Thus, the system will begin and complete execution of the example process for the child operator before continuing execution.

The system determines whether more child operators remain (750). If child operators remain, the system selects a next child operator of the current operator (branch to 730).

If no child operators remain, the system generates a new query plan using partition selectors on top (760). The system can thus insert new operators into the query plan that represent the partition selectors to be placed on top of the current operator.

As the child operators return from the recursive calls, the system will repeatedly generate new query plans by inserting a new partition selector into each new query plan.

However, the system need not implement recursion in order to compute the placement of partition selectors. Furthermore, the system need not start at a root node of the query plan. Rather, the system can instead compute the placement of partition selectors starting from a particular operator in an initial query plan, e.g., as part of an optimization request.

FIG. 8 is a flow chart of an example default process for computing the placement of partition selectors relative to a current operator. The system can implement different functions for compute how to place partition selectors for each type of operator. If the system has not implemented a function for a particular operator type, the system can use the default processing shown in FIG. 8. The process will be described as being performed by a system of one or more computers, e.g., the master node 212 of FIG. 2.

The system receives input partition selectors for the current operator (810). For example, the system can receive input partition selectors in a request to compute partition selectors for a current operator, e.g., the request (720) of FIG. 7.

The system selects a next partition selector (820). The system can iterate over each partition selector at the current operator and consider each partition selector separately.

The system determines whether the corresponding dynamic scanner is defined in the subtree of the query plan rooted at the current operator (830). In other words, the system determines whether the dynamic scanner that corresponds to the selected partition selector occurs as a descendant of the current operator.

If not, the system places the partition selector on top of the current operator (branch to 850). The system can, for example, add the partition selector to a set of partition selectors that should be placed on top of the current operator.

If the corresponding dynamic scanner is defined in the subtree of the query plan rooted at the current operator (830), the system pushes the current partition selector to a child operator. For the default operator case, the system may assume that the current operator has only one child. The system can add the partition selector to a set of partition selectors that should be pushed to the child of the current operator.

The system then determines if more partition selectors remain (860). If so, the system selects the next partition selector (branch to 820). If not, the process ends, and the system can return the set of partition selectors that should be placed on top of the current operator as well as a set of partition selectors that should be pushed to the current operator's children.

FIG. 9 is a flow chart of an example process for computing the placement of partition selectors relative to a select operator. Unlike the default process, when the system pushes a partition selector through a select operator, the partition selector can be annotated with a predicate expression on the partitioning key of the select operator. In general, as in the default process, the system iterates through partition selectors received for a current select operator. And, as described above for the default process steps 830 and 850, the system determines whether the corresponding dynamic scanner is defined in the subtree of the query plan rooted at the current operator. If not, the system places the partition selector on top of the select operator. These steps are not repeated in FIG. 9 for simplicity. Thus, the process begins with the system receiving a partition selector that is defined in the subtree of the select operator. The process will be described as being performed by a system of one or more computers.

The system receives at a select operator a partition selector defined in a subtree of the current operator (910). Thus, the system will push the partition selector to a child node of the select operator. But first, the system determines whether it can add any predicate expressions to the partition selector.

The system determines whether the select operator includes a predicate expression on the partitioning key (920). In general, the system identifies predicate expressions supported by the partition selection function $f^*_T$. For example, in FIG. 3, the select operator 310 includes a predicate expression "pk=5" on the partitioning key.

If the table referenced by the select operator is a multi-level partitioned table with multiple partitioning keys, the system can determine whether the select operator includes any predicate expressions on any of the predicate keys of the table.

If the select operator does not include a predicate expression on the partitioning key, the system pushes the partition selector to the child operator (branch to 950).

If the select operator includes a predicate expression on the partitioning key, the system identifies predicate expressions pushed from above (branch to 930). The system identifies any predicate expressions that have already been associated with the partition selector.

The system annotates the partition selector with a conjunction of all the predicate expressions (940). In other words, the system can "and" together the predicate expressions pushed from above with the predicate expression on the partitioning key to generate a new predicate expression. The new predicate expression can require all of the previous predicate expressions to be true for a tuple to be selected by the select operator.

In some implementations, the system represents the predicate expressions as a set of sets of predication expressions on each of one or more partitioning keys. For example, for a single-level partitioned table, the system can associate the partition selector with a single set of the predicate expressions on the partitioning key. For a multilevel partitioned table, the system can associate the partition selector with multiple sets of predicate expressions, each set corresponding to a different partitioning key. Thus, some partitioning key sets may be empty if there are no predicate expressions for some partitioning keys.

The system pushes the annotated partition selector to the child operator (950). The system can repeat the process in FIG. 9 for all partition selectors at the select operator that have corresponding dynamic scanners defined in the subtree of the select operator.

FIG. 10 is a flow chart of an example process for computing the placement of partition selectors relative to a join operator. In general, as in the default process, the system iterates through partition selectors received for a current join operator. And, as described above for the default process steps 830 and 850, the system determines whether the corresponding dynamic scanner is defined in the subtree of the query plan rooted at the current operator. If not, the system places the partition selector on top of the join operator. These steps are not repeated in FIG. 10 for simplicity. Thus, the process begins with the system receiving a partition selector that is defined in the subtree of the join operator. The process will be described as being performed by a system of one or more computers.

The system receives at a join operator a partition selector defined in a subtree of the current join operator (1010). Thus, the system will push the partition selector to one of the join's children nodes of the select operator.

The system determines whether the corresponding dynamic scanner is defined in the outer side of the join operator (1020). In other words, the system determines in which subtree, the inner side or outer side, the corresponding dynamic scanner is defined.

If the partition selector is defined in the subtree of the outer side, the system pushes the current partition selector to the outer child (1030). For example, the system can maintain separate sets of partition selectors that should be pushed to the outer child and partition selectors that should be pushed to the inner child. The system can thus add the partition selector to the set for the outer child.

If the partition selector is not defined in the subtree of the outer side, the system determines whether the join operator has a predicate expression on a partitioning key (1040). In the example in FIG. 6B, the hash join had a predicate that referenced the partitioning keys of both the Orders table and the Date Dimension table.

If the predicate expression does not reference a partitioning key of either table, the system pushes the partition selector to the inner child (branch to 1080). For example, the system can add the partition selector to a set of partition selectors to be pushed to the inner child operator.

If the predicate expression references the partitioning key of either table, the system can further annotate the partition selector with the predicate expression of the join operator (branch to 1050).

The system identifies predicate expressions pushed from above (1050). In other words, the system identifies any predicate expressions that are already associated with the partition selector.

The system annotates the partition selector with a conjunction of predicate expressions (1060). As described above, the system can identify predicate expressions for each of potentially multiple partitioning keys. The system can then associate the partition selector with a set of sets of predicate expressions for each partitioning key. The system can generate each set of predicate expressions by computing a conjunction of any predicate expressions for the partitioning key already associated with the partition selector with the predicate expression for the partitioning key of the join operator.

The system pushes the annotated partition selector to the outer child operator (1070). The system can then repeat the process in FIG. 10 for all partition selectors at the join operator that have corresponding dynamic scanners defined in the subtree of the select operator.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," "software engine," or "software module" refers to a software implemented input/output system that provides an output that is different from the input. An engine or module can be an encoded block of functionality, such as a library, a platform, a software development kit ("SDK"), or an object. Each engine or module can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines or modules may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving a representation of a query plan generated for a query, the query plan comprising a plurality of operators that, when executed by one or more computing nodes, cause the one or more computing nodes to compute a result for the query, wherein the query plan includes a dynamic scan operator that represents a first computing node obtaining tuples of one or more partitions of a table from storage and transferring the tuples to a second computing node that executes a parent operator of the dynamic scan operator;

generating a partition selector operator corresponding to the dynamic scan operator, wherein the partition selector operator represents a third computing node that executes the partition selector operator including determining one or more partition identifiers of partitions of the table and transferring the one or more partition identifiers to the dynamic scan operator of the first computing node;

determining a location in the query plan for the partition selector operator, including repeatedly relocating the partition selector operator below a next child operator in the query plan until determining that one or more stopping criteria are reached, wherein the relocating the partition selector operator for a particular child operator that is a join operator comprises:
    determining that the join operator does not have a predicate expression on a partitioning key; and
    in response, pushing the partition selector operator to an inner child operator of the join operator; and
generating a modified query plan having the partition selector operator at the determined location.

2. The method of claim 1, wherein determining that one or more stopping criteria are reached comprises determining that the dynamic scan operator is not defined in a subtree of a current child operator of the query plan.

3. The method of claim 1, wherein repeatedly relocating the partition selector operator comprises recursively calling a partition location function for each next child operator.

4. The method of claim 1, further comprising:
    determining that a particular child operator is a select operator; and
    in response, appending a first predicate expression from the query to the partition selector operator before pushing the partition selector operator below the select operator.

5. The method of claim 1, wherein relocating the partition selector operator for a particular child operator that is a join operator comprises:
    determining that the dynamic scan operator is defined in an outer subtree of the join operator; and
    in response, pushing the partition selector operator to an outer child operator of the join operator.

6. The method of claim 1, wherein determining the location in the query plan for the partition selector operator comprises placing the partition selector operator above a first child node for which the one or more stopping criteria are satisfied.

7. A system comprising:
    one or more computers and one or more storage devices implementing one or more computer nodes, the one or more storage devices storing instructions that are operable, when executed by the one or more computers, to cause the one or more computers to perform operations comprising:
    receiving a representation of a query plan generated for a query, the query plan comprising a plurality of operators that, when executed by the one or more computing nodes, cause the one or more computing nodes to compute a result for the query, wherein the query plan includes a dynamic scan operator that represents a first computing node obtaining tuples of one or more partitions of a table from storage and transferring the tuples to a second computing node that executes a parent operator of the dynamic scan operator;
    generating a partition selector operator corresponding to the dynamic scan operator, wherein the partition selector operator represents a third computing node that executes the partition selector operator including determining one or more partition identifiers of partitions of the table and transferring the one or more partition identifiers to the dynamic scan operator of the first computing node;
    determining a location in the query plan for the partition selector operator, including repeatedly relocating the partition selector operator below a next child operator in the query plan until determining that one or more stopping criteria are reached, wherein the relocating the partition selector operator for a particular child operator that is a join operator comprises:
        determining that the join operator does not have a predicate expression on a partitioning key; and
        in response, pushing the partition selector operator to an inner child operator of the join operator; and
    generating a modified query plan having the partition selector operator at the determined location.

8. The system of claim 7, wherein determining that one or more stopping criteria are reached comprises determining that the dynamic scan operator is not defined in a subtree of a current child operator of the query plan.

9. The system of claim 7, wherein repeatedly relocating the partition selector operator comprises recursively calling a partition location function for each next child operator.

10. The system of claim 7, wherein the operations further comprise:
    determining that a particular child operator is a select operator; and
    in response, appending a first predicate expression from the query to the partition selector operator before pushing the partition selector operator below the select operator.

11. The system of claim 7, wherein relocating the partition selector operator for a particular child operator that is a join operator comprises:
    determining that the dynamic scan operator is defined in an outer subtree of the join operator; and
    in response, pushing the partition selector operator to an outer child operator of the join operator.

12. The system of claim 7, wherein determining the location in the query plan for the partition selector operator comprises placing the partition selector operator above a first child node for which the one or more stopping criteria are satisfied.

13. One or more non-transitory computer storage media encoded with computer program instructions that when executed by one or more computing nodes implemented by one or more computers cause the one or more computers to perform operations comprising:
    receiving a representation of a query plan generated for a query, the query plan comprising a plurality of operators that, when executed by the one or more computing nodes, cause the one or more computing nodes to compute a result for the query, wherein the query plan includes a dynamic scan operator that represents a first computing node obtaining tuples of one or more partitions of a table from storage and transferring the tuples to a second computing node that executes a parent operator of the dynamic scan operator;
    generating a partition selector operator corresponding to the dynamic scan operator, wherein the partition selector operator represents a third computing node that executes the partition selector operator including determining one or more partition identifiers of partitions of the table and transferring the one or more partition identifiers to the dynamic scan operator of the first computing node;
    determining a location in the query plan for the partition selector operator, including repeatedly relocating the partition selector operator below a next child operator in the query plan until determining that one or more stopping criteria are reached, wherein the relocating the partition selector operator for a particular child operator that is a join operator comprises:
        determining that the join operator does not have a predicate expression on a partitioning key; and
        in response, pushing the partition selector operator to an inner child operator of the join operator; and generating a modified query plan having the partition selector operator at the determined location.

14. The one or more non-transitory computer storage media of claim 13, wherein determining that one or more stopping criteria are reached comprises determining that the dynamic scan operator is not defined in a subtree of a current child operator of the query plan.

15. The one or more non-transitory computer storage media of claim 13, wherein repeatedly relocating the partition selector operator comprises recursively calling a partition location function for each next child operator.

16. The one or more non-transitory computer storage media of claim 13, wherein the operations further comprise:
   determining that a particular child operator is a select operator; and
   in response, appending a first predicate expression from the query to the partition selector operator before pushing the partition selector operator below the select operator.

17. The one or more non-transitory computer storage media of claim 13, wherein relocating the partition selector operator for a particular child operator that is a join operator comprises:
   determining that the dynamic scan operator is defined in an outer subtree of the join operator; and
   in response, pushing the partition selector operator to an outer child operator of the join operator.

* * * * *